(12) United States Patent
Rathus et al.

(10) Patent No.: US 11,562,125 B1
(45) Date of Patent: Jan. 24, 2023

(54) SYSTEM AND METHOD OF ANNOTATING TRANSMITTED AND POSTED IMAGES

(71) Applicants: Spencer Alan Rathus, Sag Harbor, NY (US); Jeffrey Steven Nevid, New York, NY (US)

(72) Inventors: Spencer Alan Rathus, Sag Harbor, NY (US); Jeffrey Steven Nevid, New York, NY (US)

( * ) Notice: Subject to any disclaimer, the term of this patent is extended or adjusted under 35 U.S.C. 154(b) by 103 days.

(21) Appl. No.: 15/886,831

(22) Filed: Feb. 1, 2018

Related U.S. Application Data

(60) Provisional application No. 62/454,338, filed on Feb. 3, 2017.

(51) Int. Cl.
| | |
|---|---|
| *G06F 40/169* | (2020.01) |
| *H04W 4/021* | (2018.01) |
| *G06F 3/04842* | (2022.01) |
| *G06Q 30/02* | (2012.01) |
| *H04W 4/12* | (2009.01) |
| *G06F 16/29* | (2019.01) |
| *G06Q 50/00* | (2012.01) |

(52) U.S. Cl.
CPC ........ *G06F 40/169* (2020.01); *G06F 3/04842* (2013.01); *G06F 16/29* (2019.01); *G06Q 30/0207* (2013.01); *H04W 4/021* (2013.01); *H04W 4/12* (2013.01); *G06Q 50/01* (2013.01)

(58) Field of Classification Search
CPC .... G06F 16/29; G06F 3/04842; G06F 40/169; H04W 4/021; H04W 4/12; G60F 4/04842; G06Q 30/207; G06Q 50/01
See application file for complete search history.

(56) References Cited

U.S. PATENT DOCUMENTS

| | | | |
|---|---|---|---|
| 7,734,513 B2 | 6/2010 | Bonner et al. | |
| 8,412,590 B2 | 4/2013 | Elliott | |
| 2012/0245974 A1 | 9/2012 | Bonner et al. | |
| 2014/0237578 A1* | 8/2014 | Bryant | G06Q 10/10 726/7 |
| 2015/0278225 A1* | 10/2015 | Weiss | G06Q 30/0259 705/14.58 |
| 2017/0169495 A1* | 6/2017 | Rathus | G06F 21/36 |
| 2017/0185670 A1* | 6/2017 | Dua | G06F 17/241 |
| 2018/0089709 A1* | 3/2018 | Rousseau-Villella | G06F 16/9535 |

\* cited by examiner

*Primary Examiner* — Kyle R Stork
(74) *Attorney, Agent, or Firm* — The McCallum Law Firm PC

(57) ABSTRACT

The disclosed methods and apparatus provide venues such as merchandising, service, or cultural venues with the opportunity to widen the circle of patrons by annotating images captured at or nearby the venues with information about the venues. Venues may build patron loyalty by rewarding patrons who transmit or post the images, as well as those who view the annotated images. The annotations may serve as advertisements and marketing tools.

18 Claims, 12 Drawing Sheets

SYSTEM AND METHOD OF ANNOTATING TRANSMITTED AND POSTED IMAGES

CROSS-REFERENCE TO RELATED APPLICATIONS

This application claims priority to U.S. Provisional Patent Application Ser. No. 62/454,338 entitled "Autotagging Transmitted and Posted Images with Location Information and Other Data," filed on Feb. 3, 2017, which is hereby incorporated by reference in its entirety, including any figures, tables, equations, or drawings.

TECHNICAL FIELD

The system and methods disclosed herein relate to the field of annotating images that are transmitted to others or posted on social networks. More particularly, the system and methods incentivize users to include at least location information and venue associated annotations.

BACKGROUND

Due to the proliferation of user devices with image capturing capabilities and the widespread phenomenon of social media, many people often share their experiences with their friends, family, and social contacts via transmitting images or by posting images on their social networks. The population of the world is nearly 8 billion people, and according to Statista, Inc., nearly two and a half billion people are active users of social media. The rise of images posted on social networks has been nothing less than meteoric. More than 3 billion images are shared on social media every day. Recent estimates suggest that there are some 800 million monthly users of the photo-sharing platform Instagram® and that more than 40 billion photos have been posted to date. More than half of under-age-30 respondents to a 2016 poll by Statista, Inc. reported posting personal photos or videos to Facebook at least once per week. Overall, more than 250 billion photos—350 million photos per day—have been posted to Facebook®.

Advertisers, merchandisers, and institutions have taken notice of the use of visual images on social media sites as an advertising channel, so much so that by 2014, photos comprised 75% of brand Facebook® pages. According to a 2015 poll by the American Restaurant Association, 57% of restaurant owners believe that patrons taking photos of their restaurant food and posting them on social networks while they are dining should be encouraged and represents a free form of advertising, while only 9% found such activity disruptive.

SUMMARY

The principles disclosed herein disclose improvements both to the field of annotating images and the prior art. The disclosed methods and apparatus provide venues such as merchandising, service, or cultural venues with the opportunity to widen the circle of patrons by enabling users to seamlessly annotate images captured at or nearby the venues with information about the venues.

Various means for automatically annotating or tagging (autotagging) images have been disclosed in the prior art, including tagging images with descriptive information about the content of an image; the time, date or location at which the image was captured; the names of individuals who appear in the images; or the photographer. However, a commercial need remains for using positioning means to identify locations where images are captured to enable venues associated with the locations to provide tags or annotations containing promotional or advertising material that will appear with the images when posted on social media sites or transmitted to others. Moreover, in noncommercial locations or venues, using a positioning system to identify locations where images are captured allows the venues to associate annotations with the images that will provide viewers and recipients of the images with information about the venue. Such information may involve education or charity among others. In accordance with the principles disclosed herein, positioning systems, for example as Global Positioning System (GPS), will permit venues such as restaurants and retail stores to broaden their customer bases by including annotations or tags on the posting or transmission of images captured at their venues. However, direct communication between a user device and associated venue can provide the user with the precise location and identifying information relating to the venue.

The principles disclosed herein expedite and streamline the process of annotating images transmitted to other parties or posted on social networks with advertising, promotional, and other information about the locations or venues at which the images were captured.

Furthermore, the principles disclosed herein can use positioning means, such as, but not limited to, geotagging, to identify locations or venues at which images are captured, and to provide these locations or venues with means to leverage captured images as vehicles for displaying advertising, promotional, or other material as tags or annotations on transmitted or posted images. Positioning systems are well known in the art and comprise the Global Positioning System (GPS), the Global System for Mobile Communications (GSM), Wireless Local Area Networks (WLAN), and any combination thereof. User position in a wireless network can be based on the characteristics of received wireless signals, such as their time, power, and angle of arrival. Hybrid positioning techniques employ collaboration among various wireless radio access technologies in a given location. User positioning allows for real-time tracking along with Location Based Services (LBS).

The principles disclosed herein further provide for a system and method for enabling bilateral communication between (i) a server in, or electronically coupled or associated with, a location or venue such as a commercial or nonprofit establishment, a tourist attraction, or a municipality, and (ii) a user device, once the user has enabled the device to receive and transmit communications with the venue and initiated an interaction.

In addition, the principles disclosed herein incentivize or motivate users of the system to capture images using an application, or APP, that enables the users to associate the images with venue-generated tags or annotations prior to posting them on social networks or transmitting them to other parties. An exemplary method includes, but is not limited to, rewarding users for posting or transmitting such annotated images.

The principles disclosed herein also provide venues with a means of profiting from images captured at or nearby their venues. Even if the photographer comments on the image and indicates its location, there may be little or nothing to motivate a viewer of the posting to be in touch with or visit the venue, and little or no information as to what the location or venue has to offer. Autotagging images with advertising or promotional content transmitted to others or posted on social networks provides commercial venues with opportunities to expand their reach to potential new customers or visitors by disseminating these images within friendship or social media circles or networks. Thus, the images with their annotations serve as advertising and marketing tools for the venues. In the case of nonprofit locations or venues, autotagging can provide recipients and viewers of images with additional information about the locations or venues, and even the opportunity to make a donation.

Furthermore, the principles disclosed herein provide for a third level of annotation of images captured at various venues such as merchandising venues, service venues, cultural institutions, and sites of interest. Typically, the first level of annotation comprises the metadata that is associated with a photograph, which tends to include information such as the means of creation of the image, including the model number of the camera, shutter speed, and so on; the time and date of creation of the image; the location at which the image was captured, as usually determined by GPS; the name of the creator or author of the image; the standards used to create the image; the file size; copyright and contact information; IPTC data; XMP; Exif; DCMI; PLUS; VRA Core; and the like. The camera discussed herein includes digital cameras such as those on web-enabled camera phones, or smartphones.

The second level of annotation comprises the comments of the photographer or other person transmitting or posting the image. The photographer and/or another person transmitting or posting an image is referred to as the "user." When more than one person captures and transmits the image, the word "user" becomes collective, or the "editorial" plural. When users of the camera act to transmit or post the image on a social network, they are typically given the opportunity to create a comment (as in the suggestion, "Say something") as well as to edit the image.

The principles disclosed herein provide for a third level of annotation made possible by an application, or APP, that tags images with additional venue-generated information before the images are transmitted or posted. It is advantageous for stores and restaurants, as well as nonprofit institutions such as museums and cultural sites, to tag images captured at or in the vicinity of their venues with information about the venues and the merchandise, the services, and the cultural experiences they offer. Consider, for example, a patron at a restaurant who uses their user device to capture an image of a food dish and then post it to a social network, such as Instagram®, Facebook®, or Twitter®. The patron may or may not annotate the photo with the name and location of the restaurant. The principles disclosed herein provide for a system that autotags images captured at, in, or nearby various venues with information that identifies the venue, which may be supplemented by other information concerning the venue, its location, and its offerings. In the example provided, the user views the tagged image on the user device's display, can edit or comment on the image or the annotation, and then transmit or post the image.

One of the problems with associating metadata with images is that the location is frequently inexact. For example, an image captured at a densely developed location such as a restaurant within a high-rise on the northern side of Columbus Circle in New York City may be erroneously geotagged with the name of a museum located on the south side of the Circle. Users may attempt to correct the error by touching the venue identification information, which can prompt or launch a page with a drop-down menu that lists the venues in the area, thereby enabling the user to touch the correct identification information and tag the image with it. This process can be tedious, and because the drop-down menu might not list the proper venue, it would be advantageous for the venue to be able to provide its exact name and address as part of the annotation process. Furthermore, the principles disclosed herein provide venue-identifying information for images that are missing location information.

Autotagging operations are associated with an application, or APP, that is downloaded and installed on users' devices, or preloaded on their devices. Therefore, the principles disclosed herein provide for an application, or APP, that employs user devices and one or more databases to automatically suggest annotations or tags for images captured before the images are transmitted to other people or posted on social networks.

In addition, the principles disclosed herein provide for methods to promote the transmission and posting of images captured at or nearby venues with venue generated annotations. An exemplary method includes rewarding patrons and visitors for transmitting or posting venue generated annotations with captured images. Providing incentives for users to transmit or post the images they capture at or in their venues rewards them for doing something they might have done anyway, and the rewards can build patron—venue loyalty and widen the circle of patrons.

The principles disclosed herein also provide for methods to incentivize viewers or recipients of the transmitted and posted images (henceforth termed "viewers") to visit or perform a subsequent action regarding the venue. Subsequent actions regarding the venue include, but are not limited to, dining at a restaurant venue, purchasing merchandise at a retail venue, obtaining services at a service venue, or visiting a museum or cultural venue. An exemplary method for viewers to learn additional information about a venue involves presenting viewers that select the images or venue generated annotations with a menu of options comprising icons, words, other symbols, or hashtags and the like that comprise hot spots, such that additional information or services are available by means such as touching or clicking on the hot spot or issuing a verbal command. A hot spot may be the image itself. The content of the additional information—also known as the third level of annotations—is unlimited, but as examples it can refer to reviews of the venue, comments about the venue, or tweets about the venue, or it can comprise means for contacting the venue, visiting the venue, making a reservation, purchasing tickets, purchasing goods or services, obtaining more information, obtaining discounts, obtaining a personal shopper, and/or obtaining rewards for engaging in these or other actions subsequent to accessing the link to the additional information.

Furthermore, the incentives and rewards can be tailored to the preferences, interests, and needs of users without departing from the principles disclosed herein. Therefore, it will be advantageous to have an option whereby users construct profiles that can tailor or filter a plurality of available rewards or incentives.

Further, the principles disclosed herein provide for methods to automatize the process by which users have their images annotated by venues and transmitted to other parties or posted to their social networks.

Also, the principles disclosed herein provide for two-way or three-way communication between a venue system, a consumer's device, and third party systems via such data links as an image data link, a video data link, an audio data link, a programming data link, an online data link, a pictorial data link, an electronic data or programming material link, an electronic media link, an "information superhighway" data link, an Internet link, a computer network link, a local area network (LAN) link, a wide area network link, a wireless network link, an Ethernet network link, a Radio Frequency cellular network link, an Integrated Services Digital Network link, a telephone line link, a cable television line link, Wi-Fi, MMS, SMS, NFC, Bluetooth, e-mail, instant messaging, texting, and any combination thereof, including other data links of similar design now known in the art or to be developed. The venue system can transmit electronic data to the user's communication device for display in humanly recognizable form on the user's device's display. The display may be part of the user communication device, associated with the consumer communication device, coupled to the consumer communication device, and any combination thereof.

BRIEF DESCRIPTION OF THE DRAWINGS

The detailed description makes reference to the accompanying figures wherein:

FIG. 11 illustrates an exemplary user interface in accordance with the principles disclosed herein; and.

Figure 1:
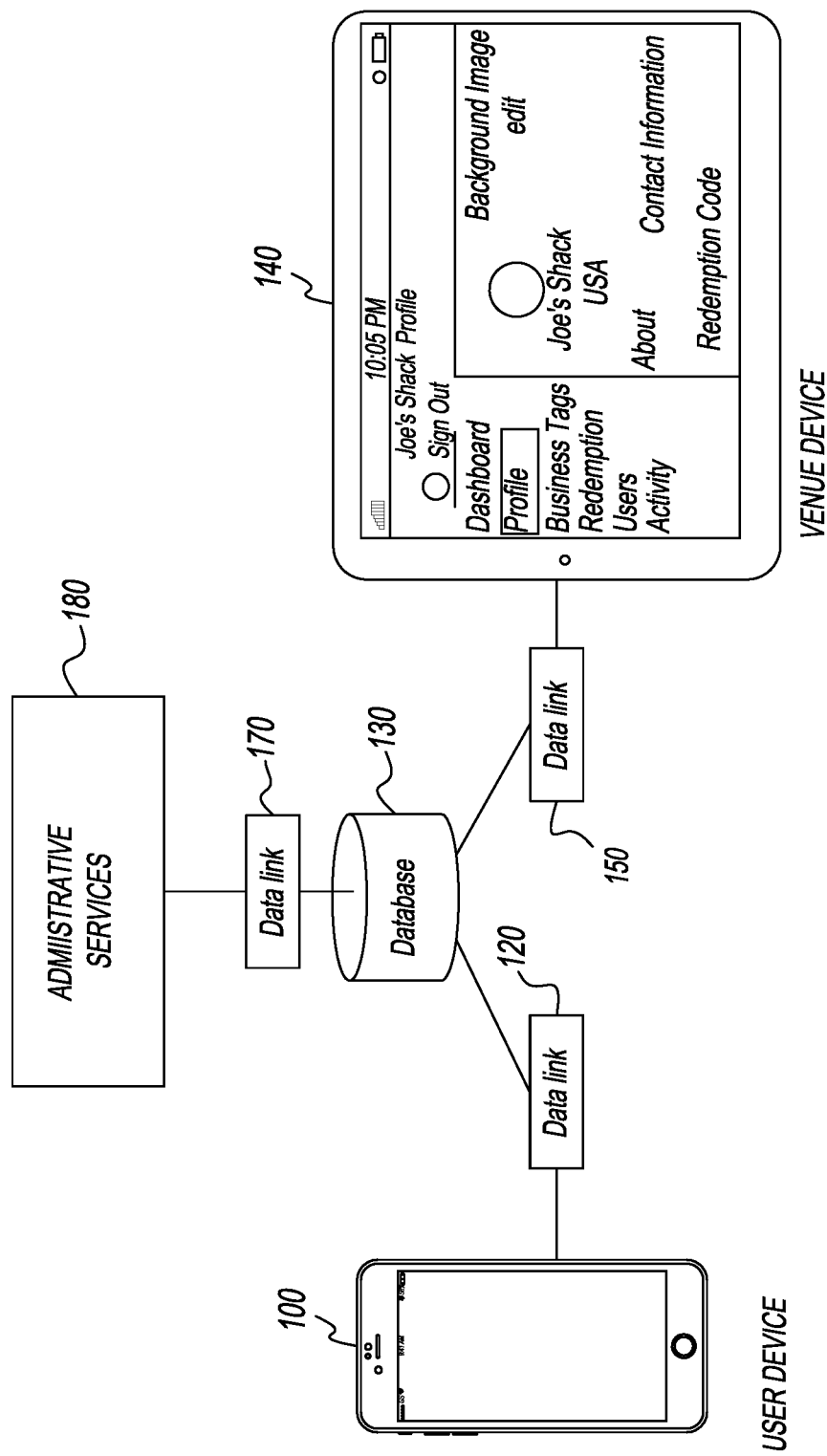
FIG. 1 illustrates an exemplary network diagram in accordance with the principles disclosed herein.

The figures are only intended to facilitate the description of the principles disclosed herein. The figures do not illustrate every aspect of the principles disclosed herein and do not limit the scope of the principles disclosed herein. Other objects, features, and characteristics will become more apparent upon consideration of the following detailed description.

DETAILED DESCRIPTION

A detailed illustration is disclosed herein. However, techniques, methods, processes, systems and operating structures in accordance with the principles disclosed herein may be embodied in a wide variety of forms and modes, some of which may be quite different from those disclosed herein. Consequently, the specific structural and functional details disclosed herein are merely representative.

According to the principles disclosed herein, the system and methods allow for a user to associate venue-generated annotations or tags with images captured at or near a venue. After selecting among the venue generated annotations, the system and methods allow the user to post the captured image, along with selected annotations and at least the venue's location information to a social network, or to transmit the captured image via email or messaging. Exemplary methods of accessing the system and methods disclosed include, but are not limited to, downloading a software application to a user device, preinstalling the application on the user device, preinstalling the functionality in the operating system of the user device, acquiring the software from a retailer or third party vendor system, or acquiring an apparatus—such as a smart card—from the venue or a third-party vendor.

The user of the system can utilize the application to access the venue-generated annotations or tags. Alternatively, the application can be in use when the camera of the user device is activated. During the initial usage of the application, the system can prompt the user to register a user profile and grant permissions to access the camera and positioning system of the user device, the user's social network accounts, and the user's contacts. Thereafter, the user can capture images at or near a given location or venue. As discussed below, the user can utilize the application to edit the captured image prior to posting or transmitting the captured image. Further, as discussed below, the system presents the user with location information associated with the captured image. The user can select the associated location after an image is capture, or alternatively the user can select the associated location at a prior time. Upon selection of the chosen venue, the venue's name and location appear, along with annotations that can be selected, are displayed to the user. The annotations can include additional information such as marketing information related to the venue. Further, the annotation can function as links that enable a viewer or recipient of the captured image and the annotations to access yet further information. As described below, the user can select the desired annotations or accept all venue-generated annotations by selecting options from a menu, utilizing touching controls, voice commands, or any other means known in the art. For an exemplary default setting, the user can post or transmit the captured image with no annotations. Further, the system can be configured to allow the user to post or transmit a captured image after selecting at least one annotation.

Thereafter, the user posts the image along with annotations to a social network or transmits them directly to another party. The annotations can comprise location information about the location at or nearby where the image was captured, slogans, or other advertising or promotional information associated with the name or location of the venue, and additional annotations as selected by the user.

As discussed below in detail, the system and methods disclosed herein incentivize a user for including venue-generated annotations. The location or venue incentivizes the user to associate annotations with the image by providing the user with a reward. Exemplary rewards can comprise points toward obtaining a free dessert or meal in a restaurant venue during a subsequent visit. Further, the rewards can comprise a discount on merchandise in a retail environment; such discount may be time limited. For example, for a symphony hall or a museum, the reward can comprise an invitation to a special event, information about an upcoming performance or exhibition, or the opportunity to make a donation to the venue.

Viewers or recipients of the annotated image can also receive rewards in the form of points, discounts, or special information for engaging in a subsequent transaction with the location or venue. For example, viewers of posted or transmitted images and annotations can be offered a free dessert at a restaurant upon making a reservation at the restaurant for at least two people. The viewer can be offered an additional 10% off sales merchandise if they order within the next two days. Further, the viewer can be presented with a schedule of upcoming exhibitions at an art gallery or a museum. As a result, the venue can widen the circle of customers or patrons. Users of the system can also be incentive to include venue-generated annotations by receiving additional rewards when viewers or recipients of annotated images engage in transactions with the venue.

Referring initially to FIG. 1, shown is an exemplary network diagram illustrating the communication between the user device, venue device, and administrative services according to the principles disclosed herein. Administrative services 180 can be implemented on hardware or a combination of hardware and software. In some embodiments, the techniques disclosed herein are implemented in a software environment such as an operating system or in an application running on an operation system. This software can include, but is not limited to, resident software, firmware, etc. or is implemented on a cloud-based or visualized network system.

User device 100, venue device 140, and administrative services 180 communicate with each other and database 130, via data links 120, 150, and 170, respectively. Data links 120, 150, and 170 can be a local area network (LAN), a wide area network (WAN), the Internet, cellular networks, satellite networks or any other network that permits the transfer and/or reception of data to and/or from database 130. The data transmitted through data links 120, 150, and 170 can be transmitted and/or received utilizing standard telecommunications protocol or standard networking protocol. For example, Transmission Control Protocol/Internet Protocol (TCP/IP) and a local network can be utilized without departing from the principles disclosed herein. Other examples of protocols for transmitting and/or receiving data include, but are not limited to, Voice Over IP (VOIP) protocol, Short Message Service (SMS), and Global System for Mobile Communications (GSM). Data links 120, 150, and 170 are capable of utilizing one or more protocols of user device 100, database 130, venue device 140, and administrative services 180. Furthermore, data links 120, 150, and 170 can translate to or from other protocols to one or more protocols of user device 100, database 130, venue device 140, and administrative services 180.

Database 130 can comprise a single database or a plurality of databases grouped together, with each database capable of receiving and transmitting information, processing information, and storing information both in memory and in storage. Communication can occur between any two components of the system (i.e. user device, venue device, and administrative services) at a given stage in the operation of the system, or among all three of the components. Database 130 can also comprise at least one database that is located in part or completely within the user device, venue device, and/or administrative services, without departing from the principles disclosed herein. One of ordinary skill in the art will readily recognize that there can be duplication of capabilities throughout the system, such that, for example, the financial history between the venue and administrative services can be stored both in the memory of the venue device and in the storage of the database, without departing from the principles disclosed herein. In yet another example, as the venue device is used to update reward information, the reward information can be stored in the venue device, the administrative services, the database, and even, in part or in full, in the user device.

Various payment methods can be utilized for accessing the system. In one example, the system is free for users to download and access on the user device. However, if the user is charged for using the service, the financial relationship would involve the user and the administrative services. The financial relationship can involve a one-time payment for downloading the application or a subscription service to the application. Further, if the application is preloaded onto the user device, the user can pay the device manufacturer or service provider an application fee in addition to the purchase price of the user device. The venues can also pay a portion or all of the usage fees for the administrative services of the application. Thereby, the communications concerning the financial relationship will occur between the venue and the application. Various models for payment, including subscription and some sort of per-use payment can also be utilized without departing from the principles disclosed. The administrative services can also provide the venue with various analytics for a fee, including but not limited to, the size of the customer base, the zip codes of the customer base, and the kinds of rewards that receive the most traction. The administrative services can also help venues track the extent to which viewers of the annotated images perform subsequent actions such as visiting the venue or making a remote purchase from the venue.

Figure 2:
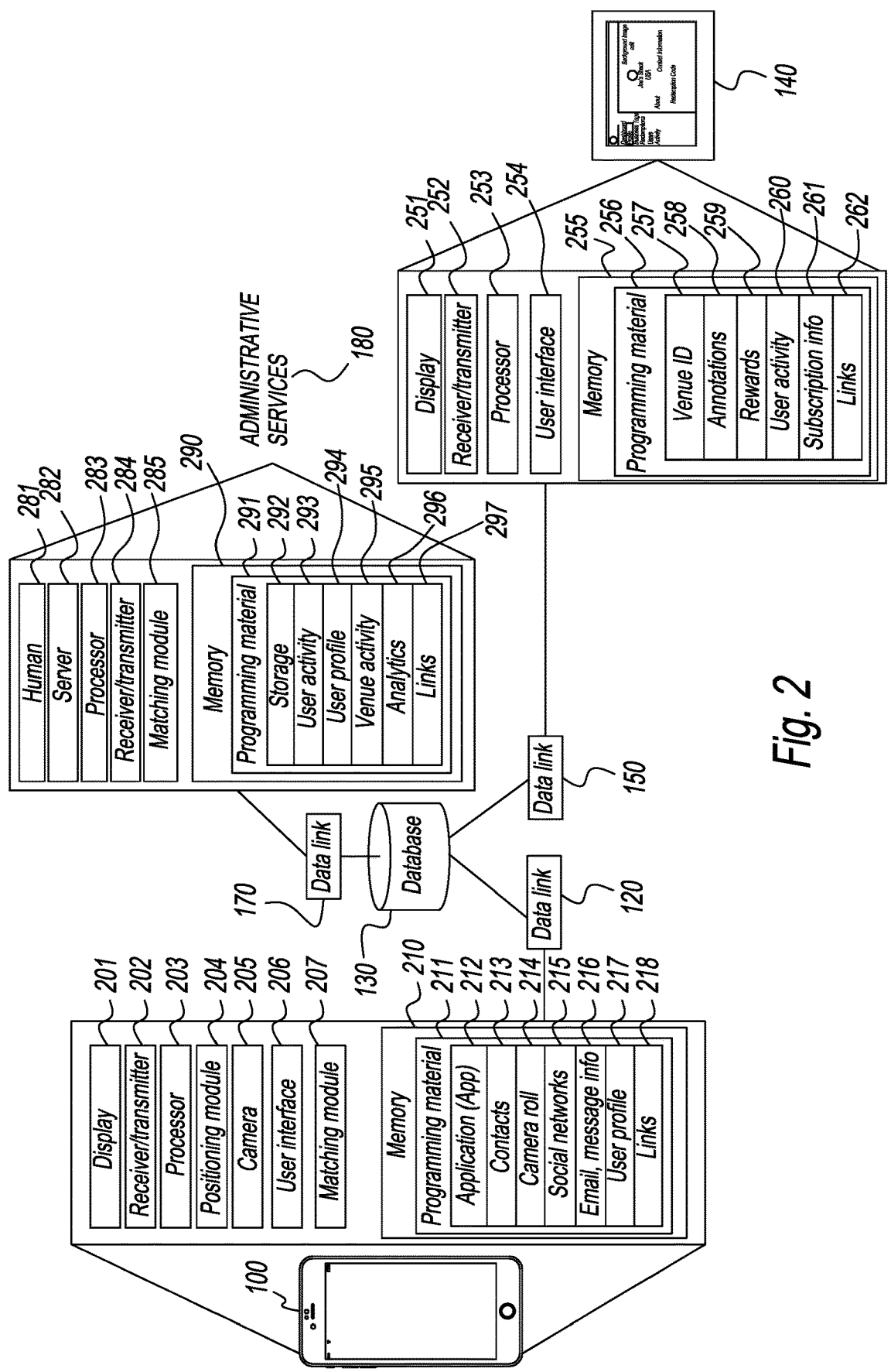
FIG. 2 illustrates an exemplary system diagram in accordance with the principles disclosed herein.

As shown in FIG. 2, user device 100 comprises display 201, transmitter/receiver 202, processor 203, positioning module 204, camera 205, user interface 206, memory module 207, and memory 210. User interface 206 can comprise a touch screen, keyboard, mouse, voice recognition, or the like. User device 100 is utilized to capture images at or in a given location or venue and can comprise any personal device including, but not limited to, a handheld communication device, wireless communication device, smart phone, mobile telephone, cellular telephone, camera-enabled cellular telephone, virtual reality (VR) glasses (e.g. a wearable computer with an optical head-mounted display [OHMD]), personal digital assistant (PDA), Internet-enabled telephone, Internet-enabled device, intelligent terminal, smart card, personal computer, phablet, tablet computer, mini-tablet computer, laptop computer, hybrid device, wearable device, desktop computer, or any other computing device.

Memory 210 comprises programming material 211. Programming material 211 comprises application 212 running on user device 100. Application 212 allows annotations generated by a venue or venues within a proximate location to user device 100 to be associated with images captured at or within the location. The images captured can also be uploaded with location information to the database, without departing from the broad concepts disclosed herein. Thereby, the process of associating the captured images and location information with the venue annotations can be processed by the database. The annotated images can then be uploaded to a social network or transmitted elsewhere using the user device. Further, the administrative services can inform the user device of rewards created by the venue device and track the user activity and the venue activity related to the transaction.

Program material 211 further comprises contacts 213, camera roll 214, social networks 215, email and messaging information 216, user profile 217, and links 218. In the present example, the user's cloud-based photo stream can be accessed via links 218. As discussed above with reference to FIG. 1, user device 100 is coupled to database 130 via data link 120. Further, database 130 is coupled to venue device 140 and administrative services 180 via data link 150 and data link 170, respectively.

A user is prompted to engage in registering and setting the accesses control for application 212 to the various components of user device 100, when application 212 is initially executed on user device 100. The user is prompted to engage in at least one user identifying activity selected from the group comprising, e.g., (1) entering an email address and a password for logging in; (2) granting permission to access the user's location via positioning module 204; (3) granting permission to access camera 205; (4) granting permission to access contacts 213; (5) granting permission to access camera roll 214 or the user's cloud-based photo stream via links 218; (6) granting permission to access social networks 215; (7) granting permission to access email and messaging information 216; (8) granting permission to create and/or access user profile 217; (9) granting permission to notify the user of posting, transmitting, and reward information; (10) agreeing with the terms of usage; and any combination thereof.

When the user subsequently opens application 212, display 201 is prefilled with camera 205 and at least one button, which enables the user to review a dashboard to see the user activity and rewards, along with redemption information. Application 212 as stored in user device 100, or as also in tandem with administrative services 180 by way of links 218, enables the user to at least: (1) utilize camera 205 to capture images; (2) select a venue either as the default location shown on display 201 or from a list of nearby locations; (3) view venue-generated annotations pertinent to the selected venue; (4) select annotations 258 to accompany the captured image; (5) edit captured images; (6) make a comment about a captured image; (7) post the captured image along with location information and venue-generated information to at least one social network 215; and/or (8) transmit the captured image along with location information and venue-generated information to another user via email and messaging 216, or other such means of electronic communication. The posting of a captured image can also provide the user with the opportunity to comment on or say something about the captured image. As a consequence of the user's posting and/or transmitting the image along with the location information and the venue-generated annotations, the venue can provide the user with a reward. The reward is intended to incentivize use of the application to annotate captured images with location information and the venue-generated annotations.

In accordance with the principles disclosed herein, the venue location and identifying information 257 comprises information about the venue can be obtained from venue device 140. Receiver/transmitter 202 of user device 100 and the receiver/transmitter 252 of venue device 140 are coupled (either automatically or manually) via data links 218 and 262 when the application is turned on and user device 100 is within or in close proximity to a venue associated with the application. The communication between user device 100 and venue device 140 can be made via short-range radio, such as Bluetooth, via Wi-Fi, WLAN positioning, radio frequency (RF) communication, real-time locating systems (RTLS), GPS, NFC, triangulation or trilateration of signals from the user device, long-range sensor positioning, optic (e.g., infrared or visible light) and acoustic (e.g., ultrasound) indoor positioning systems, and ultra-wideband (UWB) positioning, and any combination thereof. Application 212 can also set user device 100 to operate specifically within the Wi-Fi environment of a surrounding or proximate venue that has a venue device 140 that is registered with the application. The designated range of distance between venue device 140 and user device 100 can be determined or set by venue device 140, administrative services 180, application 212 in user device 100, or by any combination thereof. The nar-rower the range, the greater the probability that the venue location and identifying information 257 that is accessed by user device 100 will be solely that of the surrounding or proximate venue and not that of other venues in the general vicinity. When the user captures an image within the designated range, a signal concerning the capture is transmitted from the receiver/transmitter 202 of user device 100 to the receiver/transmitter 252 of venue device 140. Thereafter, processor 253 of venue device 140 can access the venue's location and identifying information 257 from memory 255. The information is transmitted along with any venue-generated promotional information in the form of at least an annotation to user device 100. The user can then select to use the annotations provided directly by venue device 140, or alternatively, retrieved via database 130. Thereafter, the captured image is associated or annotated with venue location and identifying information 257 and any other venue-generated annotations 258 when posted on a social network or transmitted via email, or messaging.

In an another exemplary process of determining the location of an image captured at a venue, the system can utilize at least one location grid to determine the location of the captured image. A location grid can be comprised of at least one beacon. For example, four beacons can be used around the perimeter of a venue to define a location grid. The beacon can be a Bluetooth low energy beacon and utilized to track the location of the user device within the location grid. In this example, the user device comprises a receiver/transmitter that connects with the location grid via Bluetooth and the application determines the venue associated with the location grid. The user device can also transmit the grid information to the database to determine the associated venue, without departing from the principles disclosed herein. In yet another example, the venue information is transferred to the user device when the user device connects to the location grid. In an area where multiple venues are located near each other, each location grid of the plurality of venues is associated with a unique identifier. Therefore, as the user moves from venue to venue, the application tracks the associated venues that the user device connects to. The location grid can also comprise WiFi beacons, without departing from the principles disclosed herein. It would be readily apparent to one of ordinary skill in the art to combine the location grid and the location information of the user device to improve the accuracy of determining the location of a captured image. For example, where an image is captured outside of a location grid, the system can utilize the positioning module of the user device to determine the nearest locations grids. The system can further increase the accuracy of the location by utilizing information collected from the previous locations grids that the user device connected to in combination with the positioning module of the user device to determine the direction that the user has traveled.

In yet another exemplary process wherein the user captures an image without utilizing the application or the captured image lacks geotagging, the accuracy of determining the location of the image captured can be improved by aggregating information on the locations that the user device traveled during a period of time that the image was captured. For example, the application can be configured to operate as a background service during the normal operation of the user device. Thereafter, the background service can collect location information from the positioning module of the user device. In addition, the location information collected by the background service can include information from location grids (as described above) that the user device connected to.

Therefore, the background service can log the location information for a set period of time before and after the background service detects the user device capturing an image. The logged information is associated with the captured image by the background service. As a result, when the user executes the application and selects a captured image to transmit or post, the logged information can be processed by the user device, database, venue device, or administrative services, and combination therefore, to determine the location that the image was captured.

Various methods can be employed to associate the captured image with a venue without departing from the principles disclosed herein. For example, the captured image can be transmitted to venue device 140. Thereafter, the processing of associating the image with venue location and identifying information 257 occurs at venue device 140. Next, the captured image with the associated venue location and identifying information 257 is transmitted to user device 100. In yet another example, venue device 140 transmits a captured image received from user device 100 along with venue location and identifying information 257 to database 130. Thereafter, database 130 performs the association utilizing matching module 285 of administrative services 180. In another example, user device 100 can receive venue location and identifying information 257 and perform the association via the matching module 207 of said user device 100. Other venue-generated annotations 258 can be provided via database 130, as described previously. Providing said other venue-generated annotations 258 via database 130 permits administrative services 180 to readily track user activity 293 and venue activity 295 and provide behavior analytics 296. Alternatively, other venue-generated annotations 258 can be transmitted directly from venue device 140 to user device 100. The user can select venue annotations 258, edit the image, comment about the image, post the image along with the venue location and identifying information 257 and the selected annotations 258 to at least one social network 215. In addition, the user can transmit the image along with location information 257 and selected annotations 258 via email, messaging, or other means of electronic communication 216. In this example, if the image as captured by user device 100 has associated erroneous location information that is associated with another venue in the general vicinity, the erroneous location information can also be replaced automatically with the location information 257 provided by the venue device.

In accordance with the principles disclosed herein, the user can open camera 205 without utilizing application 212 to capture an image. Thereafter, the user can execute application 212 and access the desired images from camera roll 214 or via links 218 to access a cloud-based photo stream. Typically, images are geotagged by camera 205. Therefore, application 212 can automatically perform a search of venues associated with the location information of the geotagged images. Application 212 can further include annotations 258 of the associated venues to be displayed along the captured image on display 201. In situations where the venue is incorrectly identified, the user can select the correct venue utilizing a touchscreen icon, if the venue is available and registered with the system. This situation can occur when multiple venues are located in close proximity. Selecting the correct venue (if one is available) accesses and displays the proper venue-designated annotations. Further, the system can show no results, if the venue generated annotations or the accompanying reward has expired. In this situation, the system can include an explanation of the absence of the annotation, such as "Information expired," or "Please go to venue website for current promotions." However, if the venue is identified and the reward or points have not expired, the user can select from among the available annotations. Thereafter, the user can post the image to a social network or transmit along with the user selected annotations, location information, and, if desired, a personal comment, and then receive a reward from the venue.

Exemplary locations or venues include, but are not limited to, merchandising venues, service-providing venues, cultural venues, tourist sites, and natural features. A merchandising venue can comprise, but is not limited to: a restaurant; a food merchandising establishment; a store; a retail store; a clothing store; a department store; a grocery store; a supermarket; an electronics store; an office supplies store; an auto dealership; a convenience store; a market; a bookstore; a wholesale distributor; a retail distributor; a theater; a stadium; an arena; an online store; a virtual store; and any combination thereof. Service venues can comprise: salon services such as makeup, nail trimming and coloring, hair cutting and coloring, massage, and waxing; personal shopping; health-related services such as medical services, dental services, psychological services, nursing services, social work, and chiropractic services; athletic training, including coaching, yoga, and Pilates; dance instruction; legal services; accounting services; child care services; laundry and cleaning services; travel services, including advisement and booking reservations; real estate services; food services; dietary services; rest rooms; appraisals; language services; financial services; check-cashing services; business services such as secretarial services, copying, printing, faxing, scanning, wrapping, mailing, emailing, telephony, computer use; gift wrapping; financing purchases; returns; interior decoration; landscaping services; repair services; tailoring services; tutoring and other educational services; career advisement and training services; religious services; chapel services; matrimonial services; entertainment services; vending machines; transportation services, such as car services, car rental services, or bus, train, or airplane services; travel guides; and any combination thereof. Cultural venues can comprise museums, galleries, concert halls, theatres, libraries, educational institutions, public art, tourist sites, parks, open-air geographic features, and the like. A venue can also comprise a municipality or other governmental unit.

Various location tracking systems and methods are well known in the art (e.g., Bonner et al., U.S. Pat. No. 7,734,513;Bonner et al., U.S. Patent Publication No. 2012/0245974; Blackhurst et al., WO 2012166481; and Elliott U.S. Pat. No. 8,412,590) and therefore are not be described in detail herein. One of ordinary skill in the art will readily recognize that such systems and methods, including variants thereof, can be employed, without departing from the principled disclosed herein. Location tracking of the user device can be accomplished electronically by means such as Wi-Fi-based positioning (WPS), WLAN positioning, Bluetooth sensors, radio frequency (RF) communication, real-time locating systems (RTLS), Global Positioning System (GPS), Near-field communication (NFC), triangulation or trilateration of signals from the user device, long-range sensor positioning, optic (e.g., infrared or visible light) and acoustic (e.g., ultrasound) indoor positioning systems, ultra-wideband (UWB) positioning, and other means to be developed, and any combination thereof.

Examples of venue-generated annotations or information include, but are not limited to: the name and address of the venue; directions to the venue; advertising or promotional information about the venue; information about merchandise, food or beverages served, services, or cultural possibilities offered by the venue; third-party reviews; availability of discounts; a promo code; sales; membership or subscriptions; ticketing information; exhibition information; scheduling information; historic information; news; supplemental advertising and marketing information; hashtags; and any combination thereof. Yet further examples of venue-generated information include, but are not limited to, contact information, the opportunity to acquire more information about the venue or its products, services, or cultural offerings, the opportunity to purchase or lease merchandise, information about related merchandising or service venues, a listing of other cultural venues in a geographic location, and the like. In accordance with the inventive concepts disclosed herein, at least some venue-generated information is rendered in humanly recognizable form in proximity to, or adjacent to, the transmitted or posted image.

Because venue-generated information can be too lengthy to browse effectively along with the image, various identification methods and indicia, such as commonly-known hashtags, can be used to access the venue-generated information. According to the principles disclosed herein, the venue-generated information, including additional executable links, can be accessed by selecting the captured image directly. Also the venue generated information can be accessed by touching, clicking on, or otherwise accessing an icon, or a hot spot on the display of the user device. One of ordinary skill in the art will readily recognize that any other kind of humanly recognizable or machine recognizable symbols or indices can be utilized, without departing from the principles disclosed herein. Further, verbal commands can be utilized that prompts or launches a new page or an electronically generated verbal response. In-image methods such as moving a mouse over the image to reveal an overlay of a segment of the image or to produce a pop-up box directing the user to a new page may also be employed. In addition, the hot spot can comprise a string of words or characters, for example, "Click on me for V.I.P. status," "Click on the photo for V.I.P. status," "Touch me for V.I.P. status," "Touch the photo for V.I.P. status," or "Touch me for tickets." The preview of the captured image can also be a hot spot.

In accordance with the principles disclosed herein, venue-generated annotations are not limited to advertisements and marketing information. Theses annotations can include, but are not limited, to general news, public service announcements, and any additional information selected by the venue. For example, an image captured at an automobile dealership can comprise executable links to information about the importance of using seat belts, the history of the development of automobiles going back to the 1885 Benz patent that memorialized "a new and useful improvement" in internal combustion engines, and other educational and public service materials. The annotations can also mirror or duplicate information posted on a social network by an organization when a viewer clicks on or touches an image posted on that network by the organization. For example, on January 23 the American Museum of Natural History posts an image of an event "Spotlight Asia: Year of the Rooster" on Facebook®. The image comprises an Asian drawing of a rooster. Also visible is an invitation to "Celebrate #LunarNewYear and the Museum on Saturday, February 4." Additional information about the exhibition is posted accompanying the image, and a comment that member can attend for free, while visitors can attend by paying the general museum admission. Touching or clicking on the image, or touching or clicking on a hashtag associated with the image, can launch a new page providing (1) more information about the timing of the event, (2) the address of the museum and directions, (3) an executable link to purchase tickets, and (4) the opportunity to make a donation to the museum. For example, a family visiting the museum a week or two before can an event can capture an image of their child pointing at the fossilized bones of a dinosaur. Thereafter, family transmits the image to extended family and friends or posts the image on a social network. Typically, the image might be time-stamped and possibly have location information, but it does not include the museum's annotations. However, the principles disclosed herein enable the museum to annotate the image with the information that the organization—in this case, the museum—would have used to tag the image if the organization had posted the image.

Rewards 259 can comprise material objects, points that can be exchanged to obtain objects or services, financial remuneration, participation in a lottery, game, or promotion, and even the opportunity to donate to a charity or a nonprofit organization. In accordance with the principles disclosed herein, the rewards offered to the user can be determined based on information in a user profile. User device 100 is associated with user profile 217. User profile 217 can be stored in user device 100, or a user profile can be stored in a remote or cloud-based database, such as the database 130, which is also associated with the administrative services 180. User profile 217 enables the venue to tailor or narrow rewards according to the interests or preferences of the user. The user can create the user profile and establish user preferences by using the application or software program that enables the user to upload and store demographic information, preferences, interests, wish lists, gift lists, and other personally relevant information. An exemplary process of a user constructing the user profile can involve responding to a series of questions. Exemplary question include, but are not limited to, clothing preferences—sizes, colors, styles, sex (male, female, other), and age. A restaurant can find it useful to inquire the user about their favorite dishes and food allergies. Further, there can be questions about entertainment and vacation preferences, so that tickets for preferred activities can be offered at a discount. Information regarding the user's religious preferences can also be requested. Thereby, the rewards offered can be tailored to any dietary restrictions due to the user's religious preferences, for example food that is kosher or halal. Other options for food choices can include gluten-free or low-fat foods. In yet another example, the process for a user constructing the user profile involves the user selecting from a list of keywords or phrases that relate to their preferences. Furthermore, the application can construct a user profile implicitly, automatically, and/or through the use of system driven inquiries to the user, based on inferences drawn from a record of the user activity, such as recorded telephone or online behavior, past shopping history, location history associated with the user device, and other personally relevant information.

In some cases, the user may purposefully or inadvertently select the wrong venue from a listing of nearby venues provided by the application—that is, a venue other than the one in or at which the image was captured. If an incorrectly identified venue is one that participates in the system, the user can have the option of selecting annotations from that venue and posting or transmitting them along with the location information and comments. As a result, the user can be notified of rewards received from the incorrectly identified venue. This can be advantageous to the incorrectly identified venue, because the user advertises the venue and may visit the venue to redeem the reward. If the incorrect venue is not part of the system, the user is not prompted to select annotations. The user can go on to post or transmit the image as usual, with no reward from the venue. Similarly, when the user opens the application and captures an image that is not within the radius of a venue in the system, no venue generated annotations appear and the user can save, transmit, or post the image.

The application can be preloaded on or downloaded to user device 100, without departing from the principles disclosed herein. Methods of selecting location information, associating images with location- or venue-generated annotations, and posting or transmitting the annotated images are described below. It can also be advantageous to have the capabilities of the application preloaded into the operating system of the user device. Therefore, the capabilities of the application can be accessed by means of touching a preconfigured icon from a display on the user device. In this situation, the user would not need to download or access an application to use the functionality associated with the application for identifying nearby venues and selecting venue-generated information and annotations to accompanying images transmitted to others or posted on social networks.

Turning next to an exemplary experience of a recipient or viewer of images in accordance with the principles disclosed herein, the captured image and venue generated annotations 258 are transmitted to the viewer or posted on a social network. The viewer can be "friend" of the user on a social network or "friend of friends." Next, the viewer sees the image captured on a social network with information about the venue and venue generated annotations 258 supplied by the venue. The viewer touches or otherwise activates a tag—such as a hashtag—or an annotated icon or a hot spot, or uses an in-image method, and, in one example, obtains supplemental information about newly arrived merchandise, along with the directions such as touch or click on this link for more information and for a discount.

As discussed above, venues such as merchandising and service venues can build patron loyalty by rewarding visitors for transmitting or posting images with venue-generated information. Moreover, user rewards or points 259 can accrue as viewers of the images respond to the images by contacting, shopping, or receiving services at the venue. In addition, venues can bring in new patrons or visitors by rewarding recipients of annotated images. Database 130 can track usage by recipients of images and credit their subsequent transactions with venues, at least in part, to the users of the system who posted or transmitted the image. The user and viewer activity can be stored by administrative services 180. Venue device can also have access to user activity 260, without departing from the principles disclosed herein.

According to the principles disclosed herein, a viewer of the posted or transmitted image and the venue-generated annotated information, or tags, can be rewarded for performing a subsequent action. Exemplary subsequent actions include, but are not limited to, requesting additional information about the image or the venue, purchasing or leasing an article of commerce from a merchandising venue, purchasing a service at a service venue, patronizing a restaurant venue, arranging to receive a reward, arranging to receive a discount, arranging financing for purchasing or leasing an article of commerce, arranging delivery of an article of commerce or a service, arranging pick-up of the article of commerce, and any combination thereof. Upon the viewer accessing the link, the system may prompt or launch a new page that presents options to the viewer of the annotated image in the form of a menu. Exemplary menu options can include, but are not limited to, "Newly arrived merchandise," "Obtain store credit card," "Finance a purchase," "Available discounts," "Obtain V.I.P. status," "Contact information," "Sign up for notifications of sales," "Take 10% off any purchase now!," "Departments," "Chat with a representative now," and the like. Selecting "Departments" can launch a new page having a menu including items such as "Furniture," "Clothing," "Housewares," "Appliances," "Books," "Movies," "Music," "Food," and the like. In addition, the system may be set up so that viewers can also obtain rewards by sharing the image with others who perform subsequent actions.

Still referring to FIG. 2, the location or venue also comprises venue device 140. Venue device 140 comprises display 251, receiver/transmitter 252, processor 253, user interface 254, and memory 255. Memory 255 comprises programming material 256, venue location and identification information 257, annotations 258 that are created and updated by the venue, rewards 259 that are created and updated by the venue, a history of user activity 260, financial module 261, and links 262. Financial module 261 comprises information, such as subscription information about the financial relationship with administrative services 180. As shown in FIG. 2, venue device 140 is coupled to database 130 via data link 150. Further, database 130 is coupled to administrative services 180 via data link 170 and user device 100 via data link 120. Thereby, venue device 140 can communicate with user device 100 and administrative services 180. Program material 256 enables the interaction with information about users of the system and information about the administration of the system, which is coupled to administrative services 180.

Venue device 140 can comprise any computing device including, but not limited to, a computer, a desktop computer, a laptop computer, an intelligent terminal, a personal computer, a tablet computer, a mini-tablet computer, a smart speaker, a hybrid electronic personal assistant and speaker, a virtual assistant, a voice-activated virtual assistant, a phablet, a handheld communication device, a wireless communication device, a smart phone, a mobile telephone, a cellular telephone, a camera-enabled cellular telephone, virtual reality (VR) glasses (that is, a wearable computer with an optical head-mounted display (OHMD)), a personal digital assistant (PDA), an Internet-enabled device, a smart card, any other hybrid device, or any other computing device.

Administrative services 180, comprises humans 281, server 282, processor 283, receiver/transmitter 284, matching module 285, and memory 290. Memory 290 comprises programming material 291, storage 292, a continually updating record of user activity 293, user profile 294, venue activity 295, analytics 296, and links 297. User profile 294 can be continually updated and be located in administrative services 180, user device 100, or both. Venue activity 295 can be continually updating records of venue activity, including information about the financial relationship with the venue, such as subscription information. Humans 281 are utilized to make business decisions, provide technical support to users and venues, handle financial transactions, handle general trouble-shooting, and develop modifications and advances in the system. Matching module 285 is configured to match images captured by the user device with venue location information 257, venue-generated annotations 258, and venue rewards 259. Administrative services 180 stores records of user activity 293 and venue activity 295. The processor 283 and programming material 291 enable the system to generate analytics 296 of user activity 293 and share the analytics with venue device 140. As a result, the administrative services can inform the venue as to which types of annotations 258 are most likely to be selected by users, which types of annotations 258 are most likely to elicit responses from viewers or recipients of images, which rewards 259 provide the greatest incentives, which users are most likely to respond to push notifications, and other information.

Figure 3:
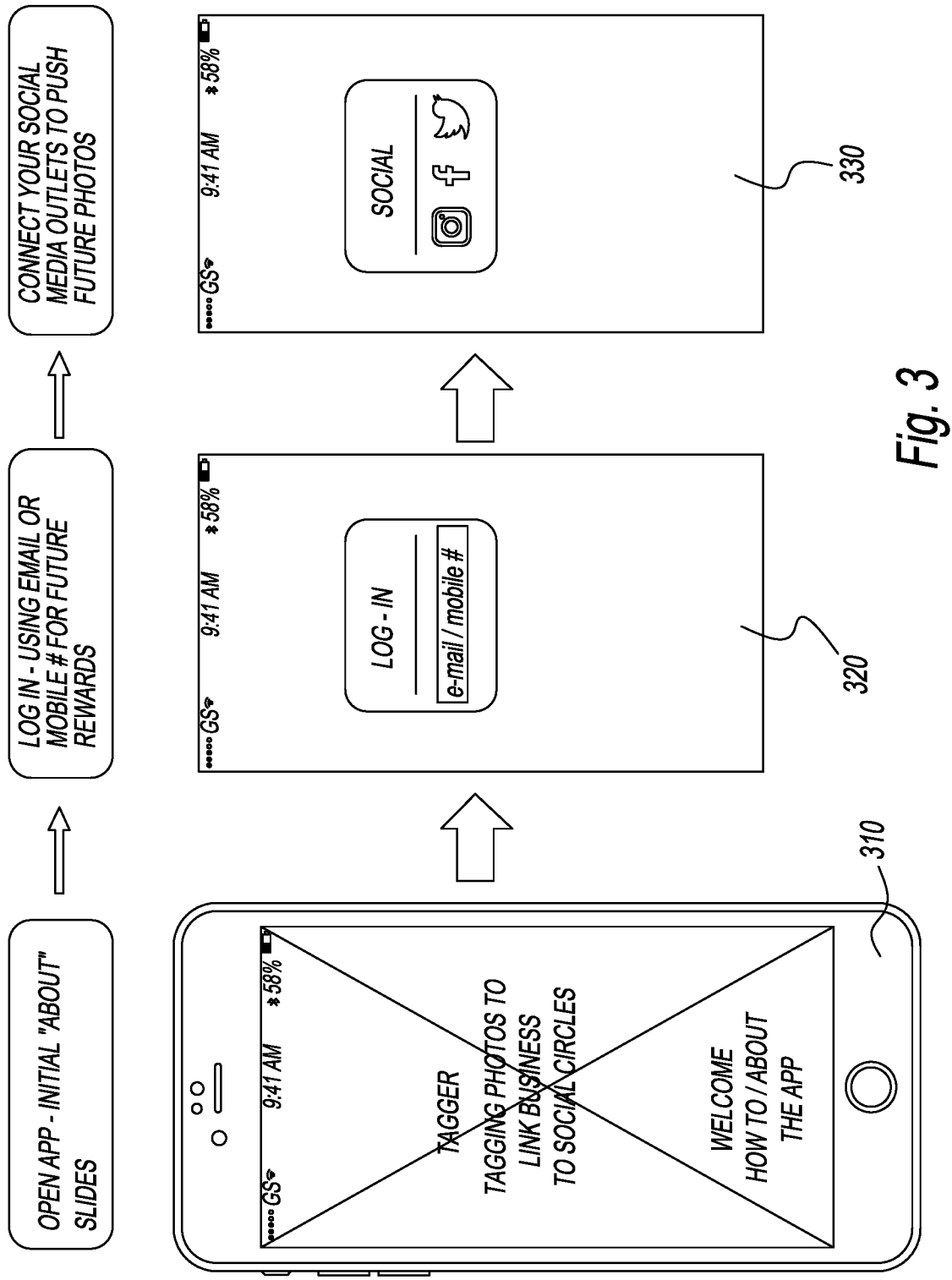
FIG. 3 illustrates an exemplary registration process in accordance with the principles disclosed herein.

Referring to FIGS. 3-10, shown is the process of a user posting the user's images, associated venue-generated annotations, and comments to social networks in accordance with the principles disclosed herein. In FIG. 3, a user downloads or opens an application on a user device for the first time. The screen of the user device presents an exemplary initial slide 310 containing information about the application. Thereafter, a signup screen is displayed. As shown in slide 320, the user registers with the system if it is their initial access of the system, or a registered user can proceed to log in. An exemplary registration process can include entering an email address, password, and the phone number associated with the user device. The phone number of the user device can be utilized to enable the reception of messages and notifications. Further, the user can provide the application with a plurality of permissions to enable the user device to receive notifications from the application and the application to access the user device. For example, the user can enable the application to access various systems of the user device including, but not limited to, the contacts, location positioning system, and camera. In addition, the user is prompted to agree to the applications terms of usage. As shown in slide 330, the user can also register utilizing user credentials for known social network providers and allow the application to access such known social network providers. The registration process can include icons or tabs for social network providers. Exemplary social network providers include Instagram® and Facebook®. Thereafter, the user can launch a social network provider from the application by selecting the icon or tab associated with the social network provider and agree to share their account with the social network provider with the application. As a result, the user can select the social network provider to automatically sign in to the account. Although the user device shown in FIG. 3, depicts the overall shape of a commonly known smart phone, including home buttons, one of ordinary skill in the art will readily recognize that other shapes and designs can be utilized without departing from the principles disclosed herein.

Figure 4:
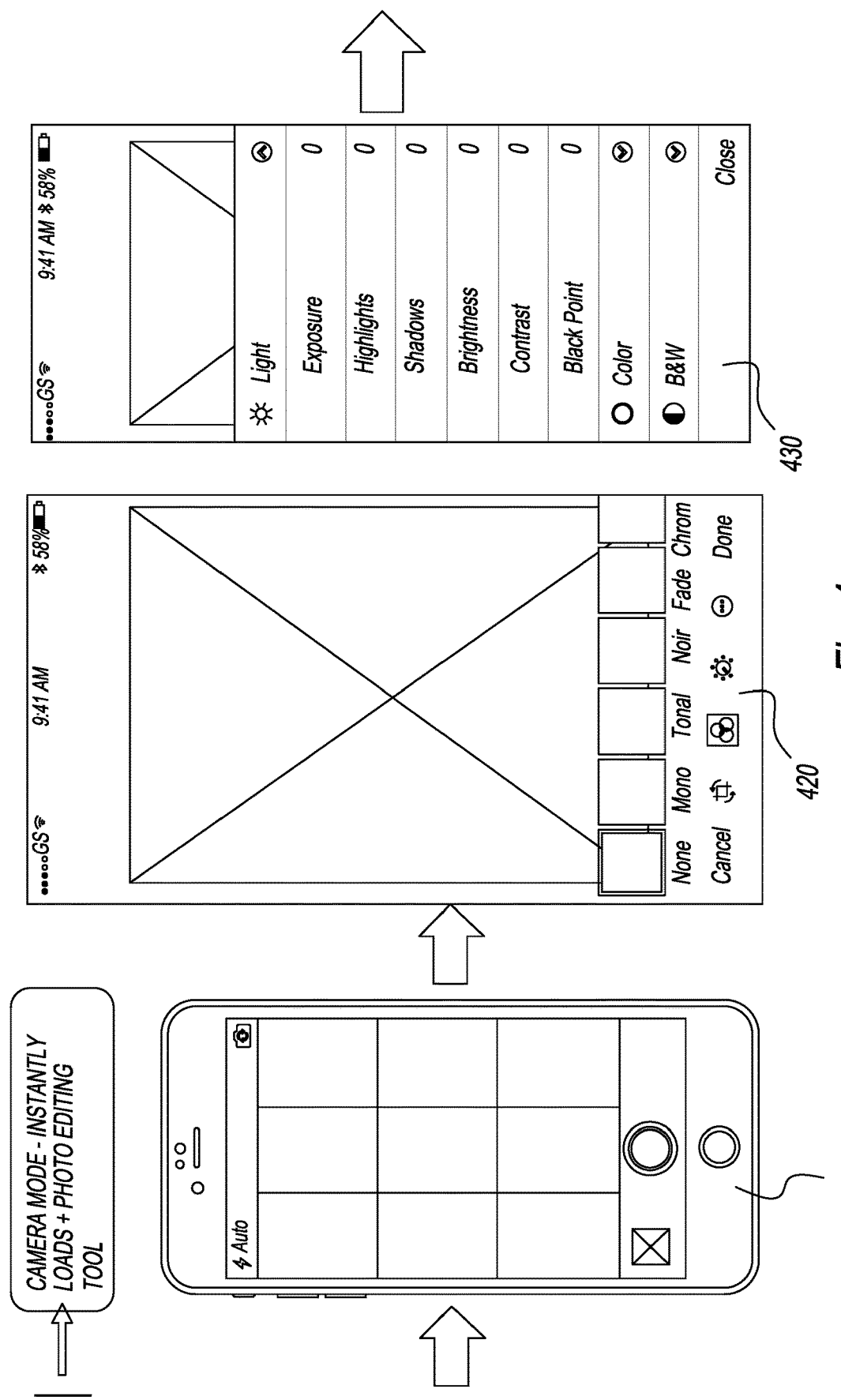
FIG. 4 illustrates an exemplary user interface in accordance with the principles disclosed herein.

FIG. 4 depicts the user interface of the application accessing the camera of the user device following the registration process. The camera function of the user device can also be deployed before the user activates the application without departing from the principles disclosed herein. As shown in display 410, the user interface comprises a link (located at the lower left portion) to a user dashboard. The user dashboard can comprise a history of the user's activity, the user's rewards, and the user's redemption of rewards. Display 420 and display 430 display show exemplary tools for capturing and editing images.

Figure 5:
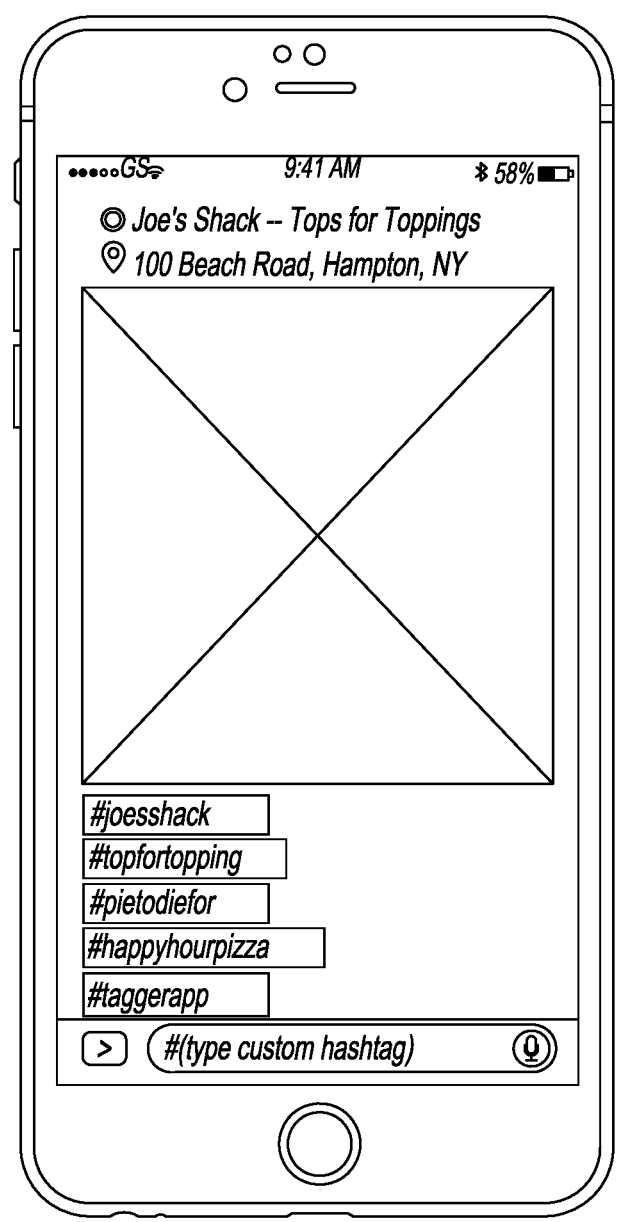
FIG. 5 illustrates an exemplary user interface in accordance with the principles disclosed herein.

Referring now to FIG. 5, shown is an exemplary user interface wherein the user device has captured an image at or in the venue associated with the location of the user device. The location information is determined by the positioning system of the user device. The captured image is shown on the display. As shown in FIG. 5, the user has selected the location of the captured image from a list of nearby locations. As a result, the name and address of the venue are displayed. Further, the venue can include a slogan—in this example, "Tops for Toppings"—which the venue has annotated to its name. Such a slogan and other annotations, such as promo codes, can be positioned at various locations of the display without departing from the principles disclosed herein. FIG. 5 also depicts a plurality of venue-generated hashtags—in this example, five hashtags are shown—from which the user can select to post or transmit along with the captured image, in order to receive various rewards. As discussed above, the user can select a location other than the location at or in which the image was captured. Accordingly, the venue generated hashtags, annotations, and tags will be associated with the location selected, provided that the location or venue is also in the system or the application. Further, the user can select among those hashtags, annotations, or tags for rewards associated with the selected venue. The user also has the opportunity to include user created hashtags to the captured image. As shown in FIG. 5, an exemplary method involves entering a hashtag in the input box indicating "type custom hashtag," which is located at the bottom of the display.

Once the user has completed selecting annotations, the user can select a button to continue the process of posting the captured images. The button can be marked "Next" or any other term or symbol. An exemplary button can comprise the right arrow depicted in the lower left of FIG. 5. A term such as "Next" may be preferable to a term such as "Add," to reduce the possibility of a user failing to add venue-generated annotations, such as hashtags, before transmitting or posting the captured image. The user advances the process of posting a captured image by pressing the button with the word "Next" (or a synonym thereof), or a symbol (such as a right arrow). The user is not provided any rewards by the venue in the situation wherein the user advances the process without selecting venue-generated hashtags or other venue-generated annotations. In effect the user will have chosen to capture the image and post it utilizing the application instead of separately accessing the camera of the user device and then accessing a social media provider to post the captured image. There are also various other reasons that a user would capture an image and post it or transmit it without venue-generated annotations. For example, the user may select the application to capture an image rather than access the camera device due to convenience. In another example, the user may not approve of any of the annotations. Further, in yet another example the application and/or venue can limit the amount of awards available per posting or transmission for a given time period. Therefore, the user may not be incentivized to include annotations for periods of time where a reward is not available.

Figure 6:
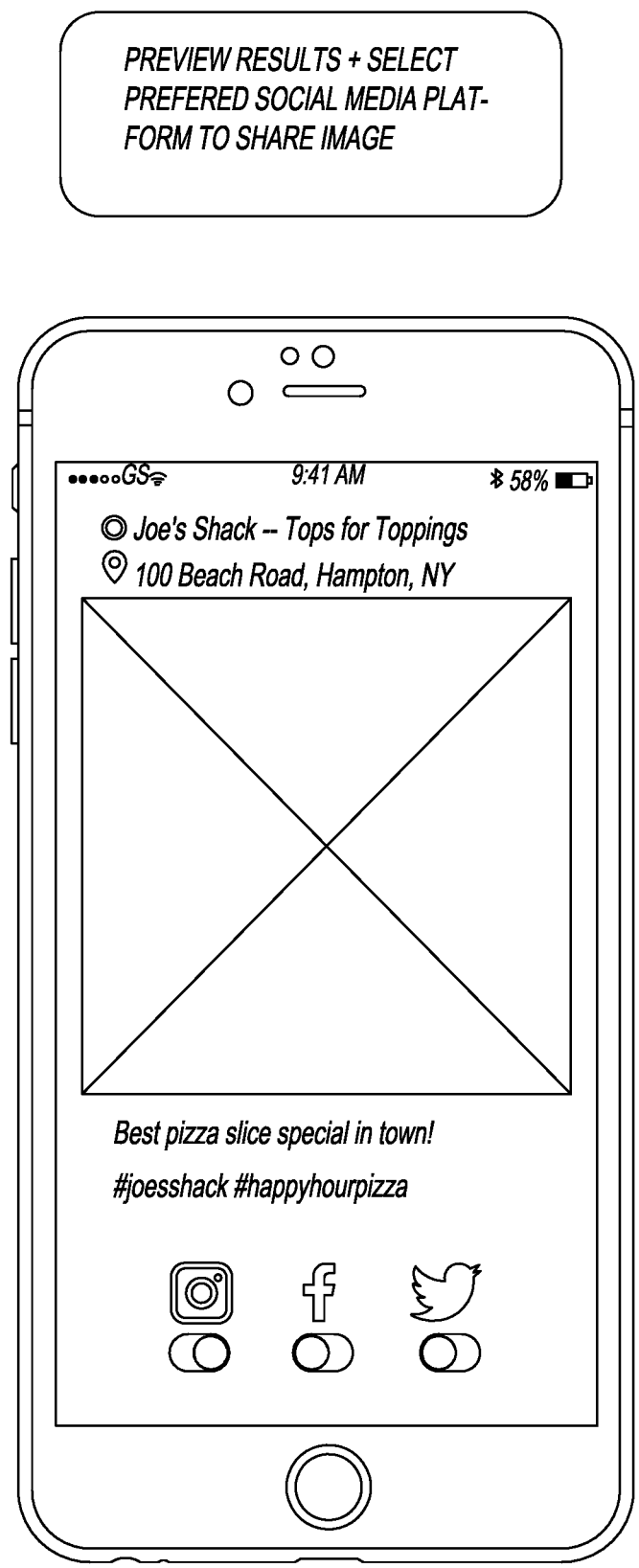
FIG. 6 illustrates an exemplary user interface in accordance with the principles disclosed herein.

Turning next to FIG. 6, shown is the process of a user selecting one or more social network providers for posting the capture image with selected annotations and hashtags. In the example shown, the user interface comprises a preview of the annotations selected by the user in the previous step, a preview of the captured image, and a preview of the venue information associated with the captured image. The user interface further comprises an input field to include a comment in addition to, or instead of, using the venue generated annotation. In this example, the venue is a pizza parlor and the user's comment is "Best pizza slice special in town!" Following the posting of the captured image utilizing the application, the user can update the post utilizing methods provided by the social network providers. In addition, the user can receive a congratulatory notification for posting the captured image with annotations and/or hashtags from the venue, along with the associated rewards earned.

Figure 7:
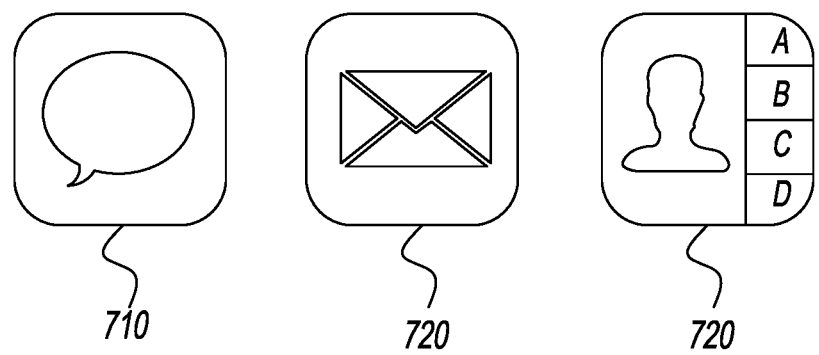
FIG. 7 illustrates exemplary icons for a user interface in accordance with the principles disclosed herein.

FIG. 7 depicts the icons of exemplary methods for transmitting a captured image with annotations from the venue. In addition to displaying icons for social network providers as shown in FIG. 6, the application can comprise of icons for transmitting the captured image and associated information through messages 710 and email 720. The user interface can also include contacts 730 of the user device. The user selects contacts 730 to display a list of contacts. Thereafter, the user can select one or more contacts to transmit the captured image and the venue-generated annotations, such as hashtags, along with any personal comments, to the one or more selected contacts via message or email. One of ordinary skill in the art will readily recognize that the venue can also provide users with rewards or points for transmitting captured images comprising venue-generated annotations or tags, and/or comments via messaging or email without departing from the principles disclosed herein. Furthermore, the recipients of messages and emails of the captures images comprising tags, and/or comments could obtain rewards or points toward rewards by acting on the information in the tags to engage in a venue-related transaction. Exemplary venue-related transactions include, but are not limited to, using the services of the venue, purchasing merchandise at the venue, or participating in venue-related promotions or activities.

Figure 8:
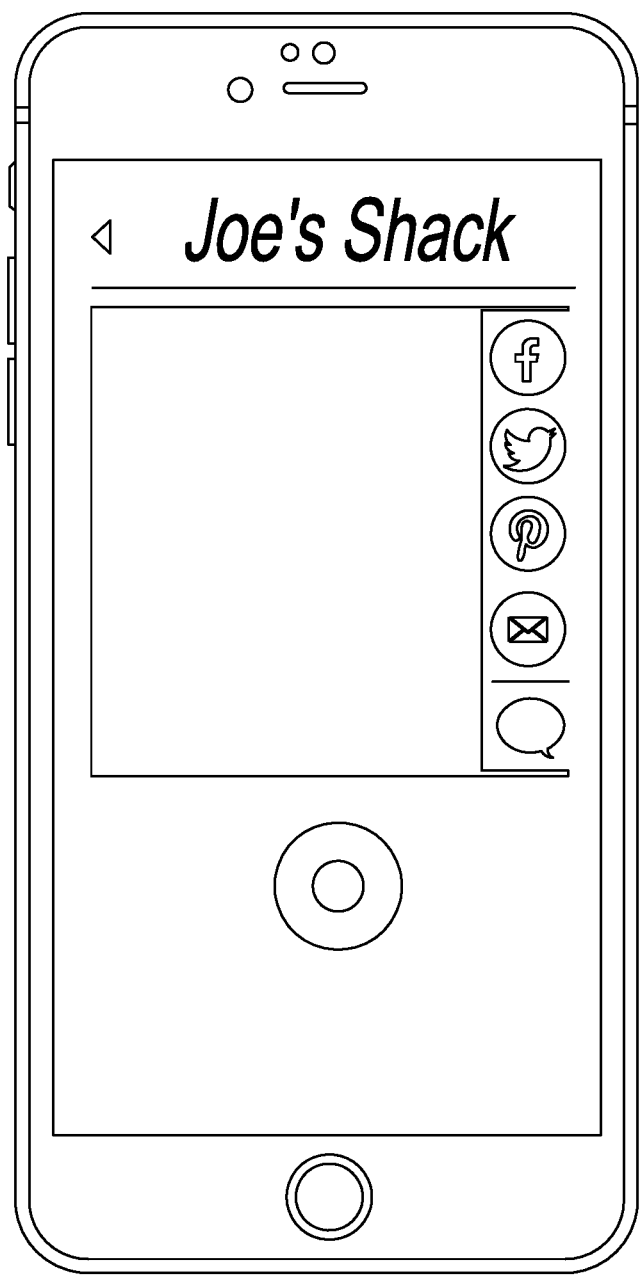
FIG. 8 illustrates an exemplary user interface in accordance with the principles disclosed herein.

FIG. 8 shows an exemplary layout for the display of the venue's name, the image captured at the venue, and icons for either posting the image to a social network or transmitting to via email or messaging. The plurality of posting and transmitting options can also be arrayed horizontally across the lower part of the display, or in any such manner without departing from the principles disclosed herein.

Figure 9:
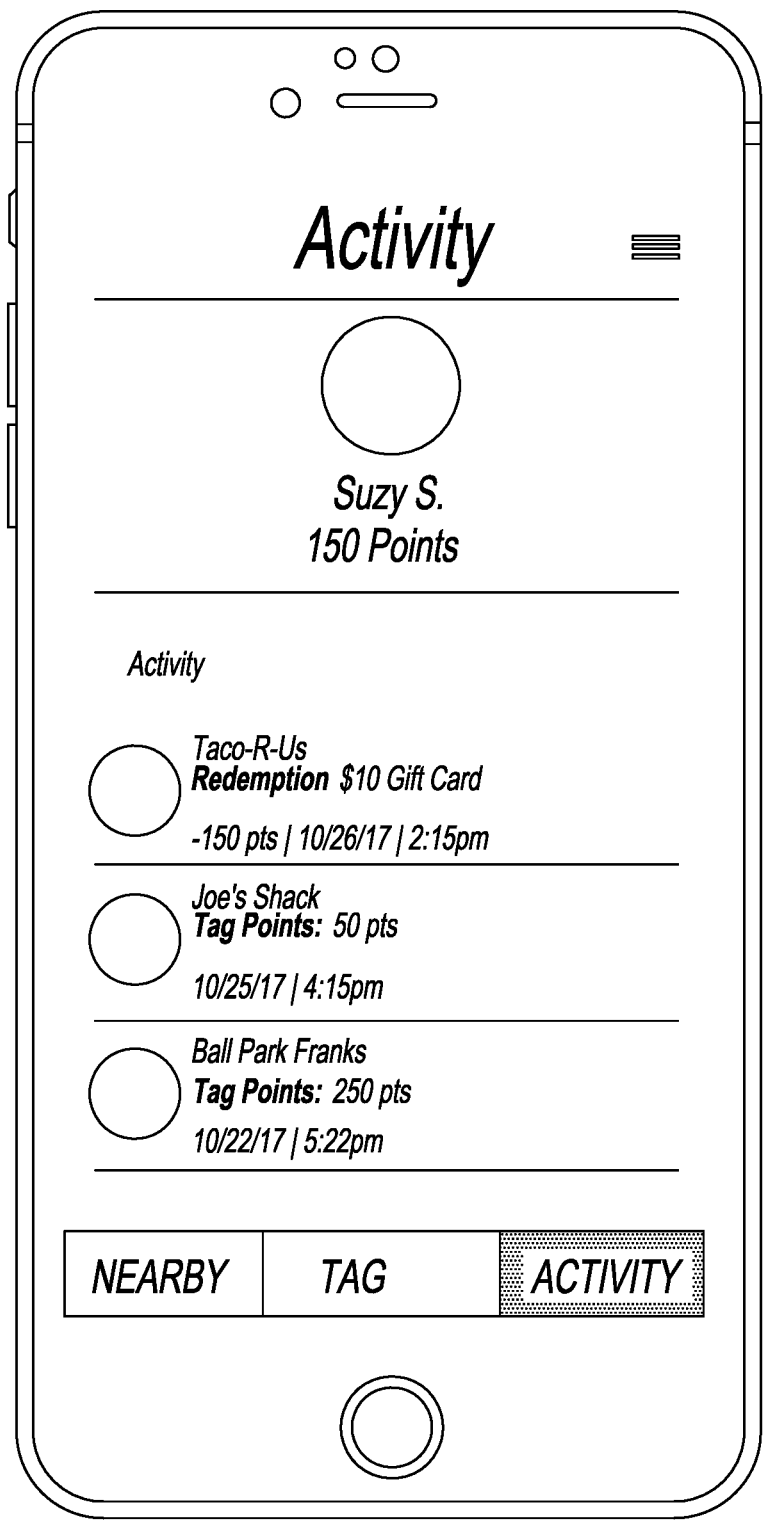
FIG. 9 illustrates an exemplary user interface in accordance with the principles disclosed herein.

Rewards are generally made when a transaction with the venue is completed. Exemplary transactions include, but are not limited to, purchasing an item at a discount, eating at a restaurant, or ordering merchandise or food online. The rewards can be accumulated and stored at a rewards hub, without departing from the principles disclosed herein. The rewards hub can be managed by the venue or by the administrative services of the application, as described in FIG. 9. Further, both the user device and the venue device can access information regarding the rewards accumulating for a user. For example, the user device can include a button for a registered user to access the rewards information. The rewards information can be presented in the form of a "rewards bank," which will enable the user to calculate or view the available user rewards. As shown in FIG. 9, an exemplary rewards bank can comprise a points system, in which the points are redeemed for the rewards. Rewards can be redeemed at the venue itself or via an online service connected with the venue. The points earned for using the system can be exchanged for rewards listed in a central registry without departing from the principles disclosed herein. The central registry can comprise a plurality of venues participating in the rewards program, and not limited to the venue at which an image was captured.

FIG. 9 also shows an exemplary user interface for viewing rewards information according to the principles disclosed herein. Typically, a registered user will access the rewards information by selecting a button after opening the application. The user interface shown in FIG. 9 comprises navigation tabs along the bottom of the user interface. The location and content of such tabs can be modified without departing from the principles disclosed herein. As shown in FIG. 9, the tabs enable users to access information about nearby locations, to tag or annotate captured images, and (by pressing the ACTIVITY tab) to view the user rewards information.

An exemplary presentation of the rewards information is depicted and includes the number of points accumulated by the users and the available rewards for a locations or venue. The rewards information can also include a history of the user's activity. As noted previously, the users can also—or alternatively—view the user histories of activity (including but not limited to, accumulation and redemption of rewards) by pressing a button when the application loads the camera of the user device.

Figure 10:
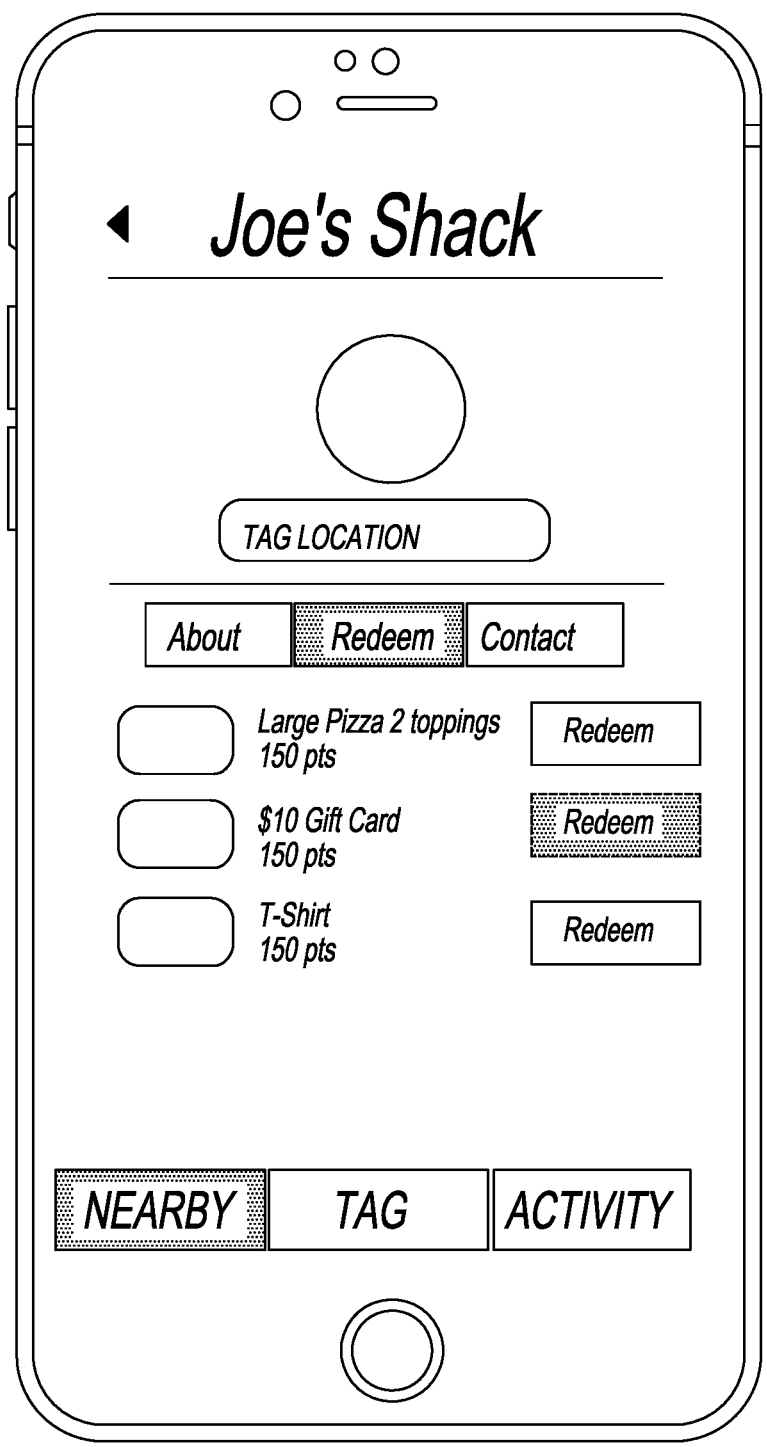
FIG. 10 illustrates an exemplary user interface in accordance with the principles disclosed herein.

As shown in FIG. 10, the rewards information can be presented as a reward hub or rewards bank. The reward hub or rewards bank allows the user to calculate or view the available rewards. Further, in the case of a points system, the reward hub or rewards bank displays the required points to redeem a reward. Rewards can be redeemed at the location of a venue. For online venues without a physical location near the user, the reward can be redeem over the phone, or otherwise redeemed during the online checkout process. Hashtags containing promo codes and other symbols can also be transmitted to the user device.

Figure 11:

Typically, users visiting the venue to redeem a reward will show a venue personnel their reward totals or their chosen reward. A code can be accessed on the user device from the rewards button and displayed to the venue personnel. The reward can be displayed during checkout, upon entry to the venue, or at some other time. The display could be a promo code or a symbol such as a Quick Response (QR) code, as shown in FIG. 11. Further, the code can be a number or other symbol that is looked up by the venue, or the reward can be in humanly recognizable form, for example "one free dessert." The venue confirms the reward by accessing its own records of the rewards for user. The verification process can be performed either automatically, for example by scanning a code, or by reading the information displayed on the user device. In this example, it will be advantageous for no additional firmware to be necessary, either on the part of the user or on the part of the venue, in order for the reward to be redeemed. Because the user device 100 is automatically coupled with the venue device 140 when user device 100 is within or proximate to the venue, the venue device may automatically access the user reward information upon user entry or proximity to the venue.

In accordance with the principles disclosed herein, not all rewards comprise commercial transactions. A nonprofit organization or educational institution can offer a user the opportunity to make a donation. For example, the system can prompt the user to touch a button or click on a link that provides forms for making donations. At a food-merchandising venue, such as a restaurant, a user could redeem a reward by launching a page that enables the user to donate food to a food bank. At a wildlife preserve, the user can donate to the care of flora or fauna or expansion of facilities or the preserve itself. In addition, a recipient of an annotated image from a preserve or other nonprofit facility could use the annotated information or links to launch a page enabling a charitable contribution. Further, the application can be designed to limit the number and amount of rewards that are made available during a visit to the location or venue without departing from the principles disclosed herein.

Figure 12:
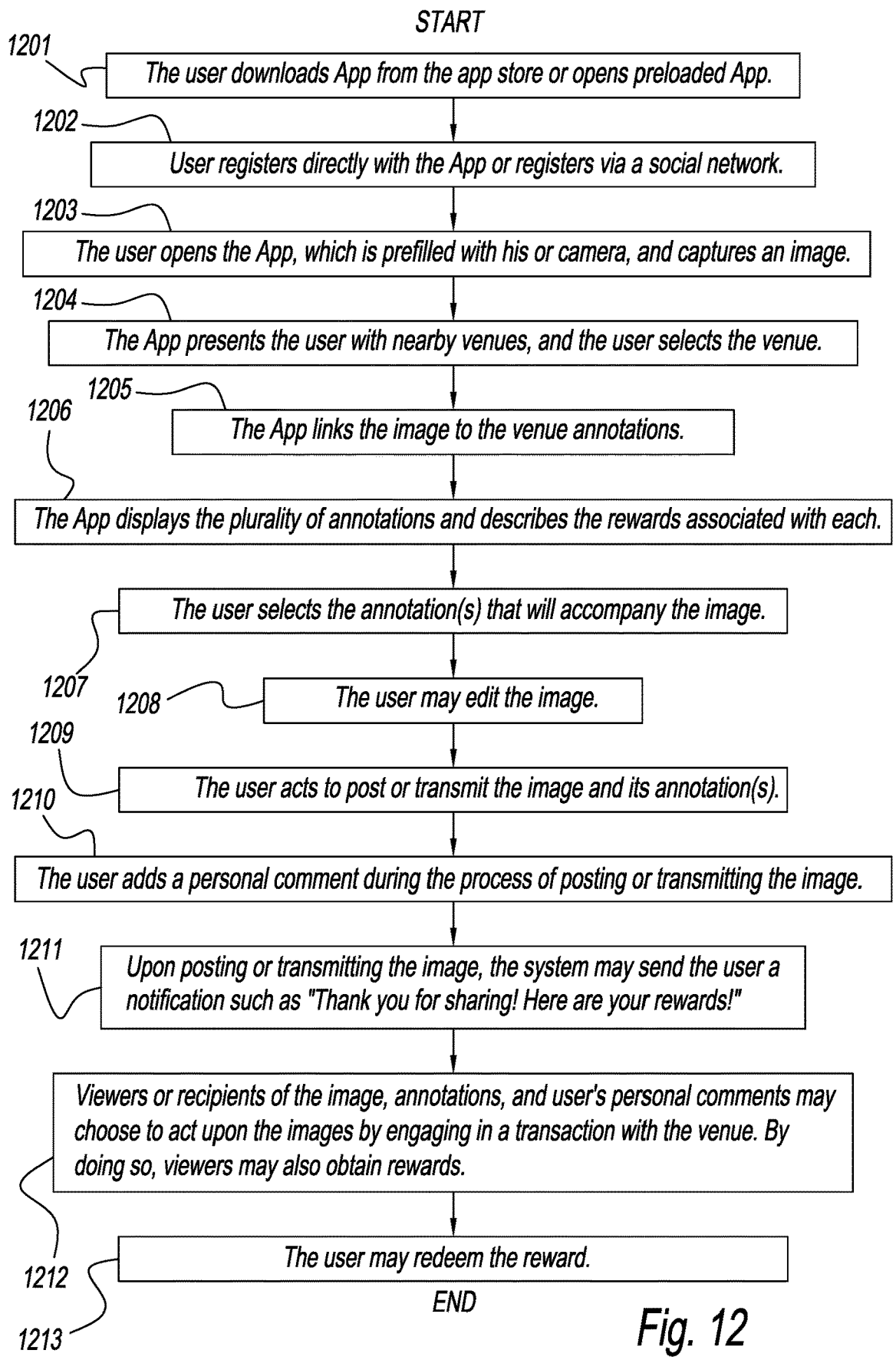
FIG. 12 illustrates a flowchart in accordance with the principles disclosed herein.

FIG. 12 depicts a flowchart representing an exemplary user experience in accordance with the principles disclosed herein. One of ordinary skill in the art will readily recognize that the order of steps can be adjusted without departing from the principles disclosed herein. For example, the user can select a location prior to utilizing the camera to capture an image. It is further apparent that not all social networks will necessarily provide the user with the opportunity to make a comment when posting an image. First in step 1201, the user downloads the application to the user device prior to opening the application. The user can proceed to open the application when it has been it has been preloaded on the user device. Next in step 1202, the user registers with the application. As discussed above with reference to FIG. 3, the registration process involves various steps including, but not limited to, providing the system with the phone number of the user device, email address, and a password. Alternatively, the user can register via a social network. Successful registration also requires granting the system permission to engage in actions such as annotating images uploaded to social networks, accessing the social networks of the user, accessing the user device's location means, notifying the user of rewards and assorted push notifications, and accessing the user device's camera. Registration also involves accepting the application terms of service or usage. In step 1203, the user captures an image using the camera of the user device and then opens the application. In the alternative, the user can open the application and utilize the application to open the camera of the user device to capture an image at or near a venue. Thereafter, in step 1204, the system matches the location information of the user device with the venue and/or location information of a plurality of nearby venues within a certain radius of the location of the user. The user is prompted to select at least one of the listed venues. In the alternative, the user can be presented with nearby locations upon opening the application prior to capturing an image with the camera of the user device. It is also possible that user device 100 will access the precise location and identifying venue-related information from venue device 140.

In step 1205, the system links the image to the venue-generated annotations or tags stored on a database or databases. Thereafter, in step 1206, the system displays the venue-generated annotations on the display of the user device and prompts the user with the opportunity to select annotations. The captured image can also be previewed on the display. Furthermore, the venue can describe the available rewards that the user will receive for posting or transmitting particular annotations. The venue can also indicate a limit to the rewards the user can receive. For example, the venue could limit rewards to be granted with the first posting or transmission on a given day. The user can also decide not to add any annotations. The display of the user device can include an option for the user to skip adding annotations to the captures images.

Next in step 1207, the user selects at least one annotation to accompany the captured image. In step 1208, the user can edit the image depending on the availability of the features on the display of the user device. The user can edit the image prior to selecting annotations. Thereafter, in step 1209, the user transmits or posts the captured images, along with any selected annotations. As part of the process of posting or transmitting a captured image, the user can include a comment in step 1210. The content of these comment may have no effect on the rewards that the user may receive.

In step 1211, the system can send the user a notification after transmitting or posting the captures image along with any selected annotations. An exemplary message is "Thank you for sharing!" Next, in step 1212, viewers of the captured image transmitted to them or posted on a social network can act upon the venue-generated annotations accompany the captured image. Exemplary actions include, but are not limited to, liking the image, commenting on the image, transmitting the image to others, or engaging in a transaction with the designated venue. Finally, in step 1213, the user can redeem a reward.

The detailed description is not intended to be limiting or represent an exhaustive enumeration of the principles disclosed herein. It will be apparent to those of skill in the art that numerous changes may be made in such details without departing from the spirit of the principles disclosed herein.

What is claimed is:

1. A system, comprising:
    a mobile digital device configured to capture an image at a location;
    a positioning system associated with the mobile digital device and configured to determine a location of the mobile digital device at the time the image was captured and generate location data;
    a database comprising venue-generated annotations for a plurality of venues, wherein each of the venue-generated annotations is generated by one of the plurality of venues for the purpose of annotating images to be posted on social media;
    a server communicatively coupled to the database and configured to, while the user is at the location:
        receive the image and the location data;
        identify one or more venues at or near the location;
        query the database for venue-generated annotations associated with the one or more venues;
        transmit the venue-generated annotations associated with the one or more venues to the mobile digital device;
    wherein the mobile digital device is configured to:
        present the image, the location data, and the venue-generated annotations associated with the one or more venues to a user of the mobile digital device;
        enable the user to post the image, post the location data, and select whether to post all or a subset or none of the venue-generated annotations associated with the one or more venues to a social network.

2. The system of claim 1, wherein the server is further configured to, upon the posting of the image and all or a subset of the venue-generated annotations associated with the one or more venues, notify the user of a reward.

3. The system of claim 2, wherein the system is configured to notify the user of the reward by one or more of: a display on the mobile digital device comprising a reward hub, an email, an SMS message, an MMS message, a telephone call, an electronic means, a printed means.

4. The system of claim 2, wherein the reward may be redeemed at one of the one or more venues, online, via telephony, via email, via messaging, via a website, via postage, or any combination thereof.

5. The system of claim 2, wherein the reward is tailored to a profile of the user.

6. The system of claim 1,
    wherein the mobile digital device is configured to display the location and the one or more venues to the user and enable the user to either accept the one or more venues or select a desired venue from a list of nearby venues;
    wherein the mobile digital device is configured to, if the user selects a desired venue, transmit the desired venue to the server; and
    the server is configured to query the database for venue-generated annotations associated with the desired venue and transmit the venue-generated annotations associated with the desired venue to the mobile digital device;

wherein the mobile digital device is configured to receive and display the venue-generated annotations associated with the desired venue to the user.

7. The system of claim 1, wherein the plurality of venues comprises a merchandising venue; a retail venue; a service venue; a restaurant; a medical, dental, professional, or educational venue; a cultural venue; a tourist attraction; a municipality; or another governmental unit.

8. The system of claim 1, wherein the mobile digital device is configured to enable the user to edit the image, add one or more user-supplied annotations, add a comment, or any combination thereof, prior to posting the image.

9. The system of claim 1, wherein at least a portion of the venue-generated annotations is in the form of a hashtag.

10. The system of claim 1, wherein the mobile digital device comprises a receiver, a transmitter, a processor, a positioning module, a display, a user interface, a memory, storage, and software.

11. The system of claim 1, wherein at least one of the venue-generated annotations is selected from the group consisting of: promotional or advertising information about a chosen venue, information about services offered by the chosen venue, a coupon, the identity of an article of commerce, the identity of the chosen venue, the location of the chosen venue, the identity and location of related venues, contact information, the opportunity to shop online at the chosen venue, a hyperlink to a new web page providing information about the chosen venue, a discount, an incentive, a reward, an icon, a link, hot spot, a hashtag, a video, a coupon, an image, humanly recognizable information, and machine-readable information.

12. The system of claim 1, wherein a viewer of the posted image, the location data, and all or a subset of the venue-generated annotations associated with the one or more venues can obtain more information by a method selected from the group consisting of: touching or clicking on the image, touching or clicking on a hashtag, touching or clicking on the at least one of the venue-generated annotations, touching or clicking on an icon associated with the image, moving or hovering a mouse or other pointing device over the image to reveal an overlay of a segment of the image, moving or hovering a mouse over the image to produce a pop-up box, touching or clicking on the image to be directed to a new page, touching or clicking on a hot spot associated with at least one of the venue-generated annotations associated with the one or more venues, touching or clicking on a code associated with at least one of the venue-generated annotations associated with the one or more venues to launch a new page comprising more information, and issuing a verbal command.

13. The system of claim 1, wherein the mobile digital device and the server communicate via one or more of the following: an image data link, a video data link, an audio data link, a programming data link, an online data link, a pictorial data link, an electronic data or programming material link, an electronic media link, an "information superhighway" data link, an Internet link, a computer network link, a local area network (LAN) link, a wide area network (WAN) link, a wireless network link, an Ethernet network link, a Radio Frequency cellular network link, an Integrated Services Digital Network link, a telephone line link, a cable television line link, Wi-Fi, MMS, SMS, NFC, Bluetooth, e-mail, instant messaging, and texting.

14. The system of claim 1, wherein the system enables a viewer of the posted image and one or more of the venue-generated annotations associated with the one or more venues to: request more information about the image or the venue, purchase or lease an article of commerce or a service from the venue, arrange to receive a reward, arrange to receive a discount, arrange financing for purchasing or leasing an article of commerce or a service, arrange delivery or pickup of an article of commerce or a service, visit the venue, make a purchase at the venue, obtain tickets, obtain information about events, make a donation, access the application, or any combination thereof.

15. The system of claim 1, wherein the server is configured to identify the one or more venues at or near the location according to the location data generated by the positioning system associated with the mobile digital device.

16. The system of claim 1, wherein each of the predesignated annotations is generated by one of the one or more venues at or near the location.

17. A system, comprising:
a mobile digital device configured to capture an image at a location;
a positioning system associated with the mobile digital device and configured to determine a location of the mobile digital device at the time the image was captured and generate location data;
a database comprising a plurality of annotations, wherein each of the annotations is predesignated by one of a plurality of venues for the purpose of annotating images to be posted on social media;
a server communicatively coupled to the database and configured to, while the user is at the location:
receive the image and the location data;
identify one or more venues at or near the location;
query the database for one or more annotations predesignated by the one or more venues at or near the location;
transmit the one or more predesignated annotations to the mobile digital device;
wherein the mobile digital device is configured to:
present the image, the location data, and the one or more predesignated annotations to a user of the mobile digital device;
enable the user to post the image, post the location data, and select whether to post all or a subset or none of the one or more predesignated annotations to a social network.

18. The system of claim 17, wherein the server is further configured to, upon the posting of the image and all or a subset of the one or more predesignated annotations, notify the user of a reward.

* * * * *